United States Patent
Shimada

(10) Patent No.: US 7,873,226 B2
(45) Date of Patent: Jan. 18, 2011

(54) IMAGE ENCODING APPARATUS

(75) Inventor: Miwa Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1276 days.

(21) Appl. No.: 11/359,588

(22) Filed: Feb. 23, 2006

(65) Prior Publication Data
US 2007/0076965 A1    Apr. 5, 2007

(30) Foreign Application Priority Data
Sep. 30, 2005  (JP) .............................. 2005-289051

(51) Int. Cl.
G06K 9/36    (2006.01)
(52) U.S. Cl. ................... 382/239; 382/232; 382/254; 382/266; 382/190; 382/199
(58) Field of Classification Search ................ 382/239, 382/232, 254, 266, 190, 199, 263; 348/606, 348/624; 358/1.9, 3.31, 447, 461, 463
See application file for complete search history.

(56) References Cited

U.S. PATENT DOCUMENTS 5,157,743 A * 10/1992 Maeda et al. ................ 382/248
5,926,212 A *  7/1999 Kondo .................... 348/207.99
2005/0265624 A1* 12/2005 Washio ........................ 382/273
2008/0123998 A1*  5/2008 Gomi et al. .................. 382/300

FOREIGN PATENT DOCUMENTS

| JP | 05-137132 | 6/1993 |
| JP | 06-038189 A | 2/1994 |
| JP | 08-194824 | 7/1996 |
| JP | 09-120458 | 5/1997 |
| JP | 09-167240 | 6/1997 |
| JP | 2001-014476 | 1/2001 |
| JP | 2003-230147 | 8/2003 |

OTHER PUBLICATIONS

JPO, Office Action mailed by Japan Patent Office, Apr. 27, 2010, in connection with corresponding JP patent application No. 2005-289051. Partial English-language translation submitted.

* cited by examiner

*Primary Examiner*—Samir A. Ahmed
*Assistant Examiner*—Ali Bayat
(74) *Attorney, Agent, or Firm*—Fujitsu Patent Center

(57) ABSTRACT

An image encoding apparatus includes a detection unit detecting edge block candidates as blocks including an edge in an image composed of plural blocks, and a determination unit excluding an edge block candidate that is recognized as no necessity of image quality improving processing executed in image encoding processing from the detected edge block candidates and determining a remaining edge block candidate as edge block to be targeted in the image quality improving processing.

8 Claims, 16 Drawing Sheets

NOTE: A TEST SEQUENCE FROM ITE (THE INSTITUTE OF IMAGE INFORMATION AND TELEVISION ENGINEERS) IS USED.

NOTE: A TEST SEQUENCE FROM ITE (THE INSTITUTE OF IMAGE INFORMATION AND TELEVISION ENGINEERS) IS USED.

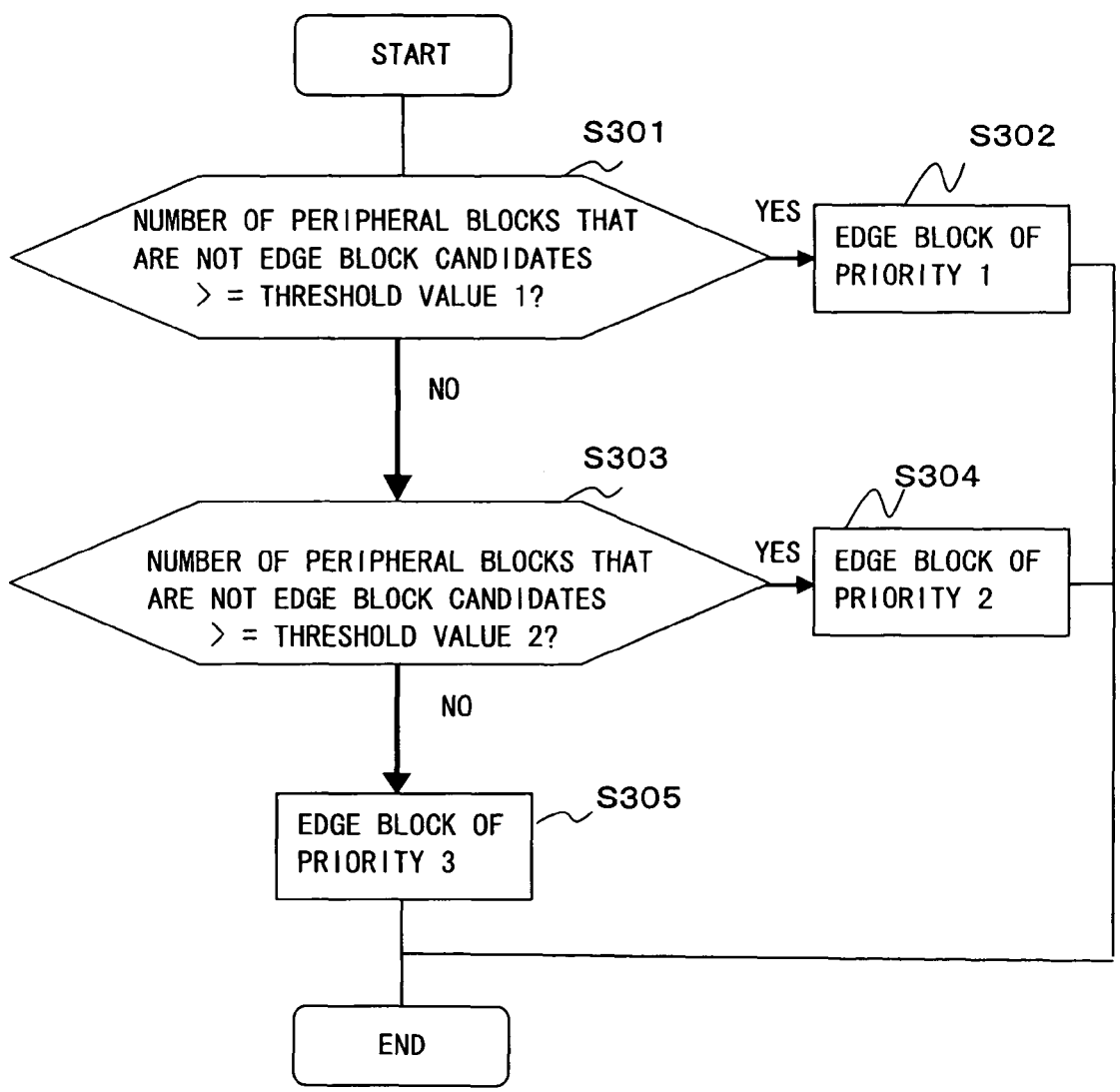

NOTE: A TEST SEQUENCE FROM ITE (THE INSTITUTE OF IMAGE INFORMATION AND TELEVISION ENGINEERS) IS USED.

IMAGE ENCODING APPARATUS

BACKGROUND OF THE INVENTION

1. Field of the Invention

The present invention relates to a field of image encoding.

2. Description of the Related Art

In a field of image encoding, there have been already proposed several techniques by which an edge (edge portion) of an object in an image is detected, and an image encoding control is executed on the basis of the detection result (edge information) (refer to Patent documents 1 to 5, for example).

There arises such a problem that, in an edge that forms a boundary of a complicated portion (large in change) and an edge that forms a boundary of a flat portion (small in change) in an image, the deterioration of the image in the edge that forms the boundary of the flat portion is more visible than that of the boundary of the complicated portion. It is desired to prevent the deterioration of the image quality by detecting such edges and conducting an image quality improving processing that is high in precision.

For example, in a method of detecting an edge by determining a difference of pixel values as disclosed in Patent documents 1 to 5, minute edges in pixel unit (for example, patterns of an object) are detected, and the method is not suitable for conducting the image improving process.

That is, because there are few influences made by the minute edges on human eyes (vision), even if the image improving processing is executed, the improvement effect is low. On the other hand, in the image encoding, a data (information) size of an image after being encoded is predetermined. Therefore, if a number of edges are detected, since data (information) amount for an image quality improvement which can be allocated to one edge is smaller, it is caused a possibility that the image quality improving processing cannot be conducted, sufficiently.

As edge detecting methods, there exist techniques that are applied in an image recognizing field other than the techniques disclosed in the above-mentioned Patent documents 1 to 5. However, it is difficult to apply the edge detecting methods in the image recognizing field to the image encoding field that requires real-time operations because the edge detecting methods in the image recognizing field are complicated and voluminous as a whole.

[Patent document 1] JP 9-167240 A
[Patent document 2] JP 2001-14476 A
[Patent document 3] JP 9-120458 A
[Patent document 4] JP 2003-230147 A
[Patent document 5] JP 8-194824 A

SUMMARY OF THE INVENTION

An object of the present invention is to provide a technique that is capable of improving the efficiency of an image encoding processing that requires a real-time operation.

Also, another object of the present invention is to provide a technique that is capable of executing an appropriate image quality improving processing.

In order to solve the above-mentioned problem, the present invention applies the following structure.

That is, the present invention relates to an image encoding apparatus, including:

a detection unit dividing an input image into blocks composed of plural pixels and detecting edge block candidates as blocks including an edge in the image; and an extraction unit excluding an edge block candidate that is recognized as no necessity of image quality improving processing executed in image encoding processing from the detected edge block candidates and determining a remaining edge block candidate as edge block to be targeted in the image quality improving processing.

According to the present invention, an edge block candidate that does not require the image quality improving processing is excluded from the edge block candidates, and the remaining edge block candidates are extracted (determined) as edge blocks. As a result, since the number of edge blocks to be targeted in the image quality improving processing can be reduced, quantity of the image quality improving processing can be reduced. In addition, since edge optimizing processing in block unit is executed, efficient image encoding processing can be executed. Also, since the number of edge blocks is reduced, sufficient information amount for improving the image quality can be allocated to the remaining edge block candidates. As a result, the appropriate image quality improving processing can be executed.

Also, the present invention provides an image encoding apparatus, including:

a detection unit detecting edge blocks as blocks including an edge in an image composed of plural blocks; and a giving unit giving a priority of image quality improving processing executed in encoding processing of the image to the detected edge blocks.

According to the present invention, the image quality improving processing according to the priority is executed in the image encoding processing. In this situation, the image quality improving processing of each edge block for obtaining the image quality corresponding to the priority is executed. That is, a level can be given the image quality improving processing under limited conditions. As a result, the appropriate image quality improving processing can be conducted.

Also, the present invention can be specified as an image encoding method and a recording medium that is stored a computer program each having the same features of the image encoding apparatus.

According to the present invention, the efficiency of the image quality encoding processing can be improved in the image encoding processing that requires the real-time operations.

Also, according to the present invention, the appropriate image quality improving processing can be executed.

BRIEF DESCRIPTION OF THE DRAWINGS

FIG. 12 is a flowchart showing an example of a priority giving process;

DETAILED DESCRIPTION OF THE PREFERRED EMBODIMENTS

Hereinafter, a description will be given of embodiments according to the present invention with reference to the accompanying drawings. The structures of the embodiments are examples, and the present invention is not limited to the structures of the embodiments.

Outline of the Invention

First, an outline of the present invention will be described. There is an image encoding apparatus that conducts encoding processing on an image, which has been divided into plural blocks, on a block basis. In edge detecting methods (for example, Patent documents 1 to 5) which have been conventionally applied to the image encoding apparatus, there is a tendency to excessively detect blocks (edge blocks) including edges. This is because, for example, patterns of an object in the image are determined (detected) as minute edges.

To cope with the above problem, there is proposed that a threshold value for determining whether or not the edge is included is adjusted to reduce the number of detection of the edge blocks. However, in the threshold adjustment, there is a case in which significant edge blocks for the image encoding do not remain.

Figure 1:
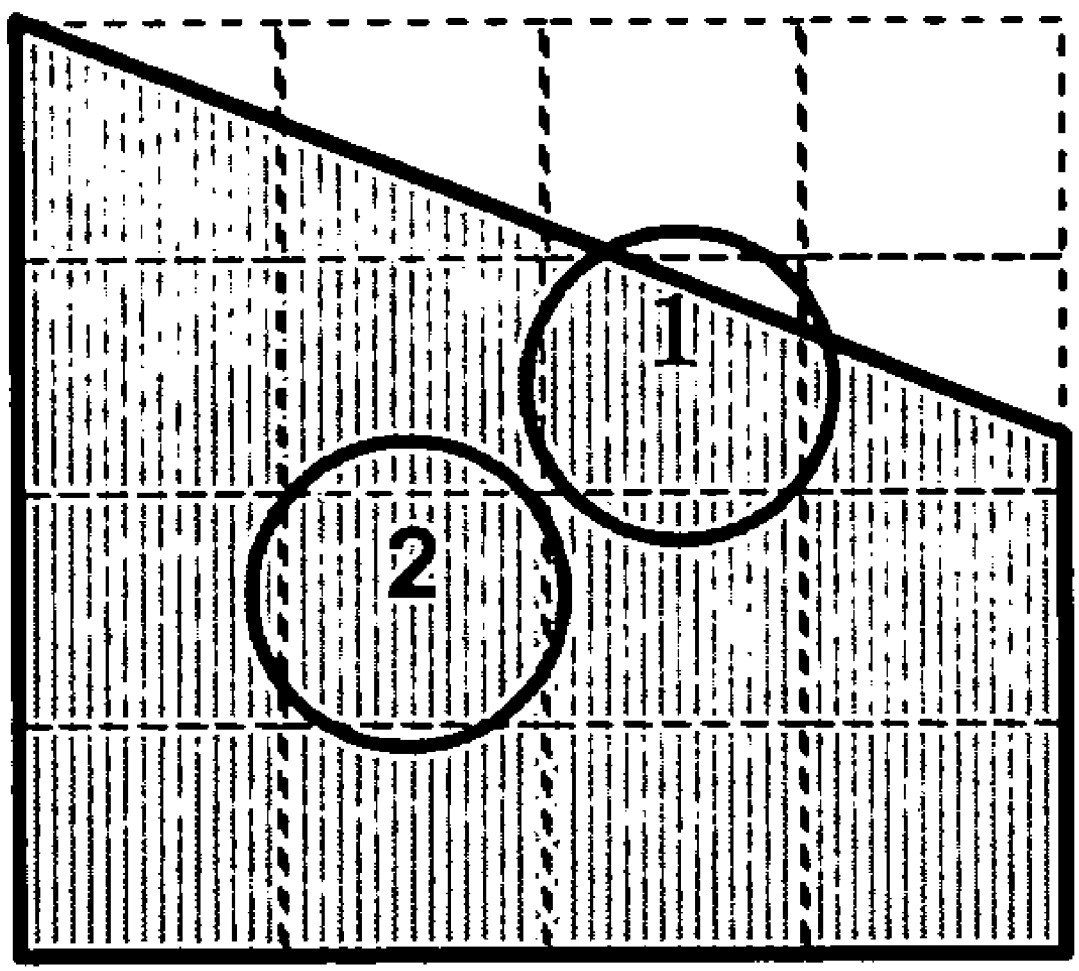
FIG. 1 is a diagram exemplifying a problem in a conventional art.

FIG. 1 is a diagram exemplifying a problem in the conventional art. In FIG. 1, an object of a trapezoid having patterns is included in an image. When the edge detecting methods according to the conventional art is applied to this image, for example, both of blocks 1 and 2 are detected as edge blocks due to the pattern (mesh pattern) of the object.

In this case, it is desirable that only the block 1 through which a contour of the object passes is detected as a significant edge block, and the block 2 is not detected as an edge block. As usual, the edge block becomes a target of the image quality improving processing. Since a total data (information) amount that can be used in the image encoding is limited, it is preferable that the number of edge blocks to be improved in the image quality improving processing is smaller. Also, the minute edge such as the pattern is not distinguished even if the image quality of the pattern is deteriorated, an influence of the minute edge on a person is small. That is, even if the image quality improving processing is conducted on the block 2, its visual effect is low. On the other hand, the deterioration of the contour line that intersects with the block 1 is recognized as an image quality deterioration distinguished by the person. Therefore, it is desirable that only the block 1 is detected as the edge block.

However, as shown in FIG. 1, the patterns included in the respective blocks 1 and 2 weighs heavily in a determination element which leads a determination result that the blocks 1 and 2 are edge blocks. That is, the block 1 is similar to the block 2 in the determination element. In this case, when the threshold value is adjusted, both of the blocks 1 and 2 are not detected as the edge block with the result that both of those blocks 1 and 2 are not to be improved in the image quality improving processing.

Under the above circumstances, according to the present invention, in order to detect the edge block which is recognized to be significant in image encoding (to be targeted on the image quality improving processing), the edge block is detected by means of the edge detecting methods disclosed in Patent documents 1 to 5 (first edge detecting processing), and a second edge detecting processing is conducted by using the result of the first edge detecting processing. That is, the edge blocks that have been detected by the first edge detecting processing are defined as edge block candidates, and significant edge blocks in image encoding are extracted from the edge block candidates.

In other words, according to the present invention, the edge blocks that are recognized to be edge blocks requiring no improvement in the image quality (low effect of the image quality improvement) are excluded from the edge blocks that are detected in the first edge detecting processing. In this way, according to the present invention, only the appropriate edge blocks are extracted by conducting the edge determinations at multiple stages.

Figure 2:
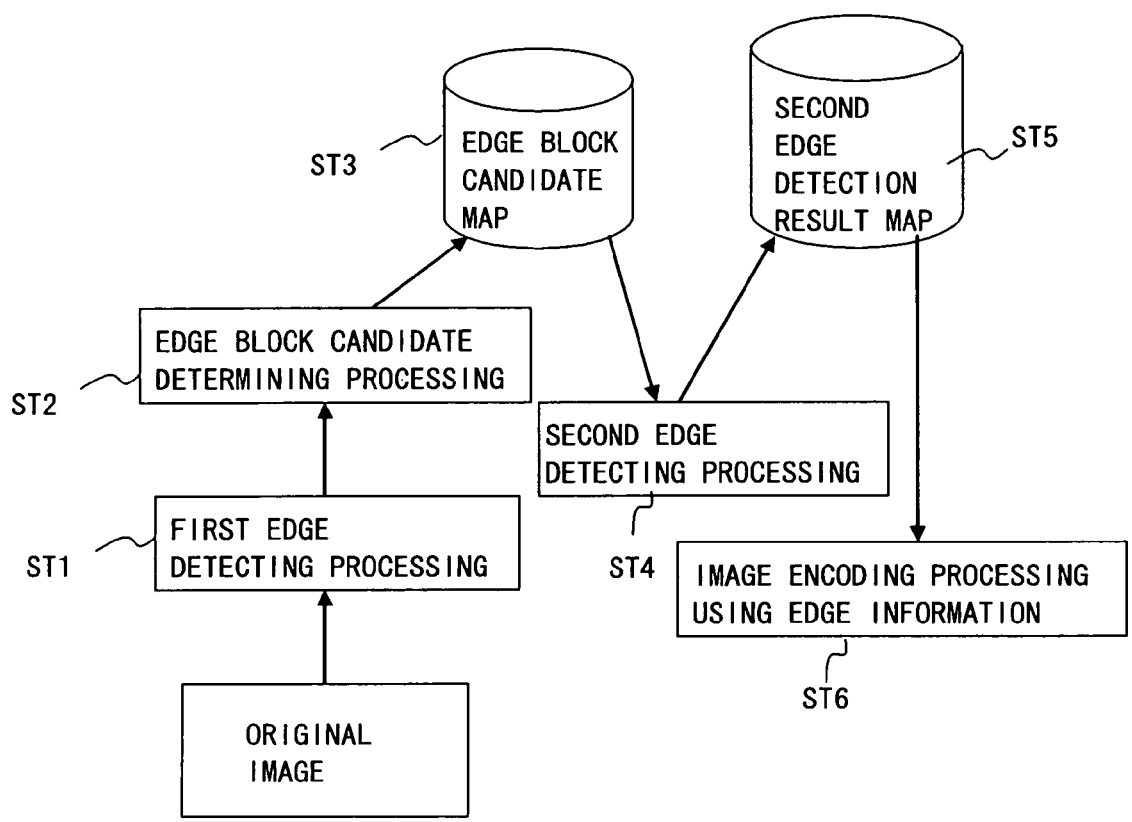
FIG. 2 is a schematic explanatory diagram showing an image encoding apparatus according to the present invention.

FIG. 2 is a schematic explanatory diagram showing an image encoding processing according to the present invention. In FIG. 2, a narrowly defined first edge detecting processing (edge pixel detecting processing) is first executed with respect to an original image to be encoded (ST1). The conventional arts disclosed in Patent documents 1 to 5 can be applied as the first edge detecting processing as described above.

Subsequently, edge block candidate determining processing is conducted according to the result of the first edge detecting processing (ST2). That is, with respect to a predetermined number of blocks into which the original image is divided, determination of whether or not each block is the edge block candidates, is executed according to the result of the first edge detecting processing. The first edge detecting processing (ST1) is conducted on a pixel basis (unit), and blocks including edge pixels that are equal to or higher than a predetermined threshold value are determined as the edge block candidates.

Subsequently, a generating and storing processing of an edge block candidate map is executed (ST3). That is, a map (edge block candidate map) in which a flag allocated to each block corresponding to the original image is turned on (is a candidate) or turned off (is not a candidate) is generated according to the result of the edge block candidate determining processing, and then stored in a predetermined storage area.

The first edge detecting processing (edge pixel detecting processing: ST1), the edge block candidate determining processing (ST2), and the edge block candidate map generating and storing processing (ST3) as described above constitute a broadly defined first edge detecting processing (first edge block detecting processing).

Subsequently, the second edge detecting processing is executed (ST4). That is, it is determined whether or not the respective blocks of the edge block candidates include the significant edges (to be improved in the image quality), and the edge block candidates including the significant edges are determined as the edge blocks. In this situation, the edge blocks including no significant edge (requiring no improvement in the image quality) are excluded.

Subsequently, the generating and storing processing of a second edge detection result map is executed (ST5). That is, a map (second edge detection result map) in which a flag allocated to each block corresponding to the original image is turned on (is an edge block) or turned off (is not an edge block) is generated according to the result of the second edge detecting processing, and then stored in a predetermined storage area.

The second edge detecting processing (ST4) and the second edge block detection result map generating and storing processing (ST5) as described above constitute a broadly defined second edge detecting processing (second edge block detecting processing).

Finally, the image encoding processing using information (edge information) represented in the second edge detection result map is executed (ST6).

Figure 3:
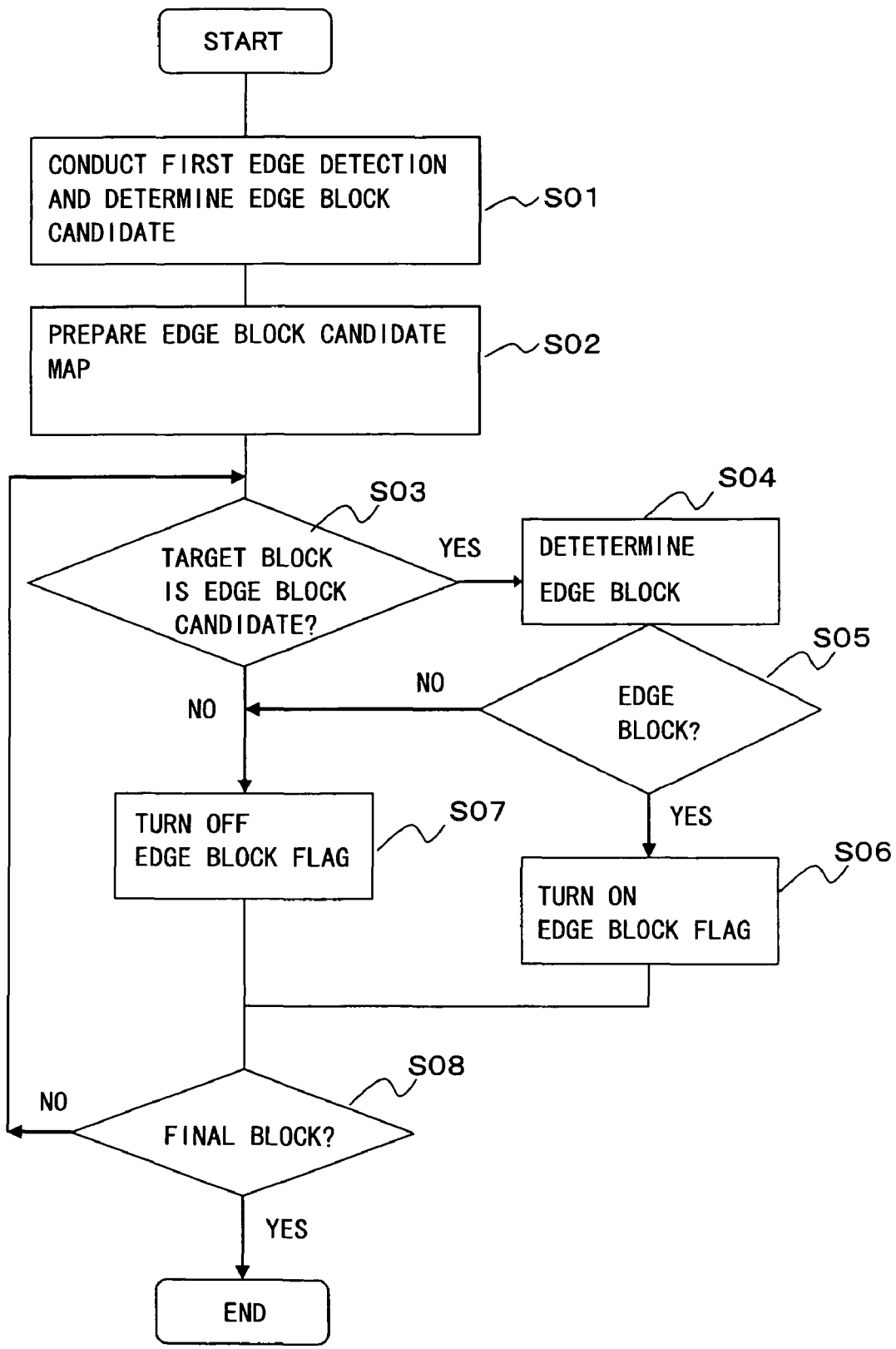
FIG. 3 is a flowchart showing the detail of a second edge detecting process in the process shown in FIG. 2.

FIG. 3 is a flowchart showing the detail of the second edge detecting processing in the processing shown in FIG. 2. In FIG. 3, the first edge detecting processing (edge pixel detecting processing) is first executed on the original image, and the edge block candidate determining processing is executed as the broadly defined first edge detecting processing (S01: ST1, ST2).

Subsequently, the generating and storing processing of the edge block candidate map is executed (S02: ST3). Then, processing of the following Steps S03 to S08 is executed as the second edge detecting processing (second edge block detecting processing).

When the second edge detecting processing starts, the edge block candidate map is read, one (target block to be processed) of the blocks in the edge block candidate map is specified, and it is determined whether or not the target block is an edge block candidate (S03).

In this situation, when the target block is not the edge block candidate (S03; NO), a flag (edge block flag) corresponding to the target block in the second edge detection result map is turned off (S07), and the processing is advanced to Step S08.

On the other hand, when the target block is the edge block candidate (S03; YES), the edge block determining processing is executed (S04). That is, it is determined whether or not the target block includes a significant edge (S05).

In this situation, when the target block includes the significant edge, the target block is determined as the edge block (S05; YES), and the edge block flag in the second edge detection result map corresponding to the target block is turned on (S06). Thereafter, the processing is advanced to Step S08.

On the other hand, when the target block does not include the significant edge, it is determined that the target block is not the edge block (S05; NO), and the corresponding edge block flag is turned off (S07). Thereafter, the processing is advanced to Step S08.

In Step S08, it is determined whether or not the target block is a final block. When the target block is not a final block (S08; NO), the processing is returned to Step S03 in order to execute the processing of steps S03 to S07 with respect to the remaining blocks. On the other hand, when the target block is the final block (S08; YES), the second edge detection result map is stored in a predetermined storage area. The second edge detecting processing is completed.

Thereafter, the image encoding processing is executed by using the edge information based on the second edge detection result map. In this situation, the number of edge blocks is reduced by removing the edge block candidates that do not require the image quality improvement in the second edge detecting processing. Accordingly, the encoding processing can be saved in labor (made efficient) by a reduction in the number of edge blocks.

Also, the reduction in the number of edge blocks means an increase in the information (image information) amount which is supplied to the respective edge blocks in order to improve the image quality. As a result, the appropriate image quality improving processing can be conducted.

In this situation, the priority of each of the edge blocks may be set with respect to the image quality improving process so that the information amount (image information amount) that is allocated to the respective edge blocks can be controlled according to the priority. As a result, it is possible to execute the efficient image quality improving processing. Alternatively, it is possible to execute the image quality improving processing in the higher order of priority.

Embodiments

Embodiments based on the above-described outline according to the present invention will be described.

<Apparatus Structure>

Figure 4:
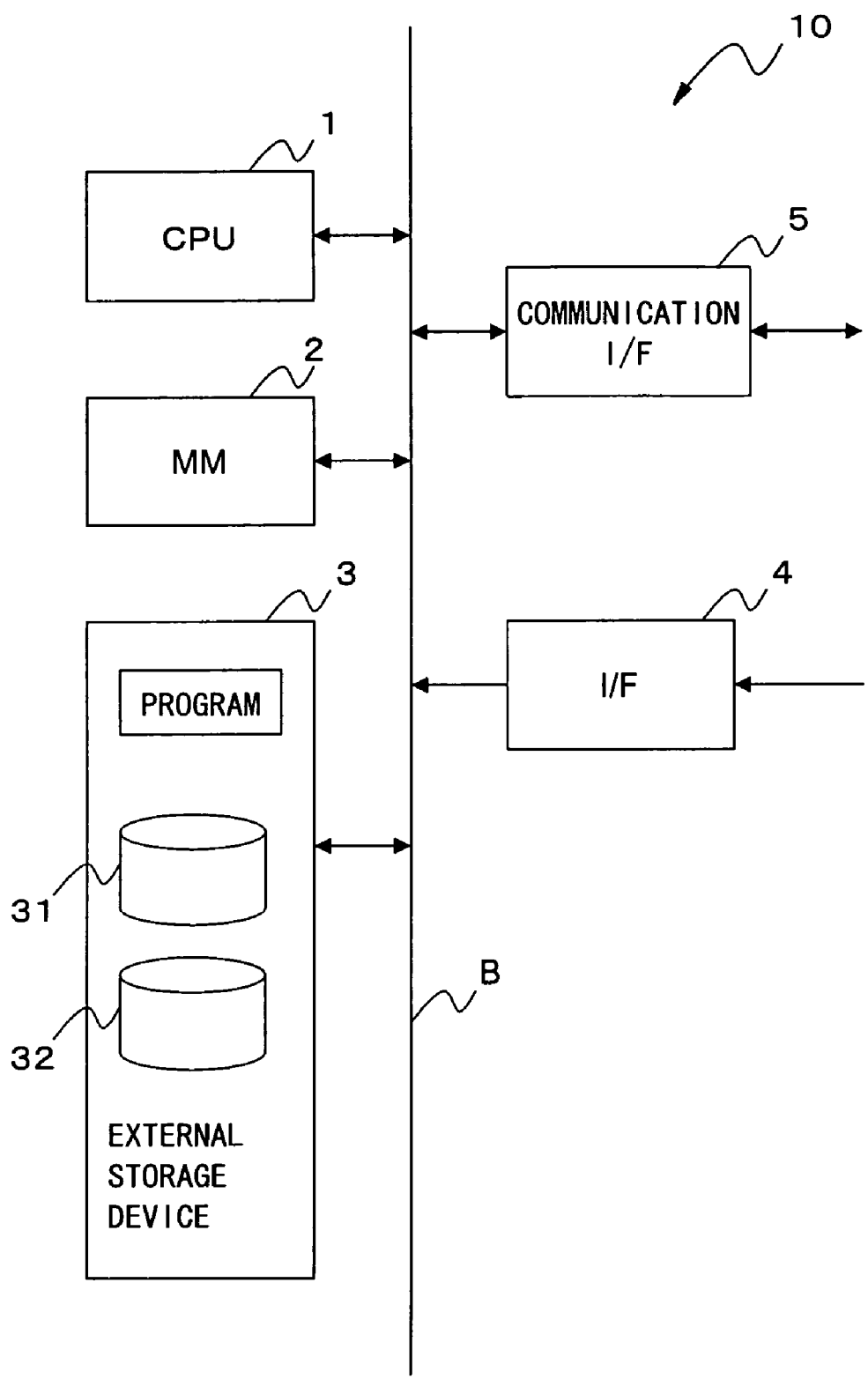
FIG. 4 is a diagram showing a structural example of an information processing apparatus that can function as the image encoding apparatus (a structural example of an image encoding apparatus)

FIG. 4 is a diagram showing a structural example of an information processing apparatus that can function as an image encoding apparatus (a structural example of the image encoding apparatus). In FIG. 4, an information processing apparatus 10 includes a CPU (central processing unit: processor) 1, a main memory (MM: for example, RAM (random access memory)) 2, an external storage device (for example, hard disk) 3, an input/output interface (I/F) 4, and a communication interface (communication I/F) 5 that are mutually connected through a bus B.

The external storage device 3 stores program for allowing the information processing apparatus 10 to function as the image encoding apparatus, which is executed by the CPU 1, and data that is used at the time of executing the program therein. In particular, the external storage device 3 includes a storage area to store the edge block candidate map (first map) and a storage area 32 to store the second edge detection result map (second map) as shown in FIG. 2.

The CPU 1 loads the program that is stored in the external storage device 3 to the MM 2 and then executes the program. This realizes the first edge detecting processing (ST1), the edge block candidate determining processing (ST2), the edge block candidate map generating and storing processing (ST3), the second edge detecting processing (ST4), the second edge detection result map generating and storing processing (ST5), and the image encoding processing, as shown in FIG. 2.

As the image encoding processing, a compression encoding processing is executed in conformity to the encoding standard of a moving picture such as MPEG-1, MPEG-2, H.264, or MPEG-4, to thereby generate a moving picture file including moving image data into which an original image has been compressed and encoded. The moving image (image) file thus generated is stored in the external storage device 3.

The I/F 4 is connected to an input device of the image or the moving image such as a camera. The image data or the moving image data which is inputted through the I/F 4 is stored in the external storage device 3, and dealt with as data (original image data) to be encoded by the CPU 1. Also, the I/F 4 is connected to an output device of the image or the moving image such as a display, and the moving image based on the moving image file which has been generated by the CPU 1 can be displayed on the output device.

The communication I/F 5 is connected to a communication device (for example, a server or a terminal device) through a network such as the Internet. The moving image file (download file or stream distribution format file) which is generated by the CPU 1 is transmitted to a transmission destination from the communication I/F 5 via the network.

With the above structure, the information processing apparatus 10 can distribute the moving image that has been photographed by the camera via the network.

The structure shown in FIG. 4 may be replaced by a structure in which a part or all of the processing shown in FIG. 2 are realized by hardware logic or the combination of the hardware logic with a software processing.

In the structure shown in FIG. 4, the CPU 1 can function as a detection unit (a detecting section), a extraction (determination) unit (an extracting (determining) section), a giving unit (a giving section), and a control unit (a control section, an image encoding section, and an image quality improving section) according to the present invention.

<Image Encoding Processing>

Subsequently, a description will be given of an image encoding processing (method) in the information processing apparatus 10 (image encoding apparatus). The image encoding processing includes an edge block detecting processing as shown in FIG. 2, and the edge block detecting processing includes the above-mentioned first and second edge block detecting processing. Also, the image encoding processing includes an image quality improving processing for the edge block.

<<First Edge Block Detecting Processing>>

[First Edge Detecting Processing (Edge Pixel Detecting Processing)]

Figure 5:
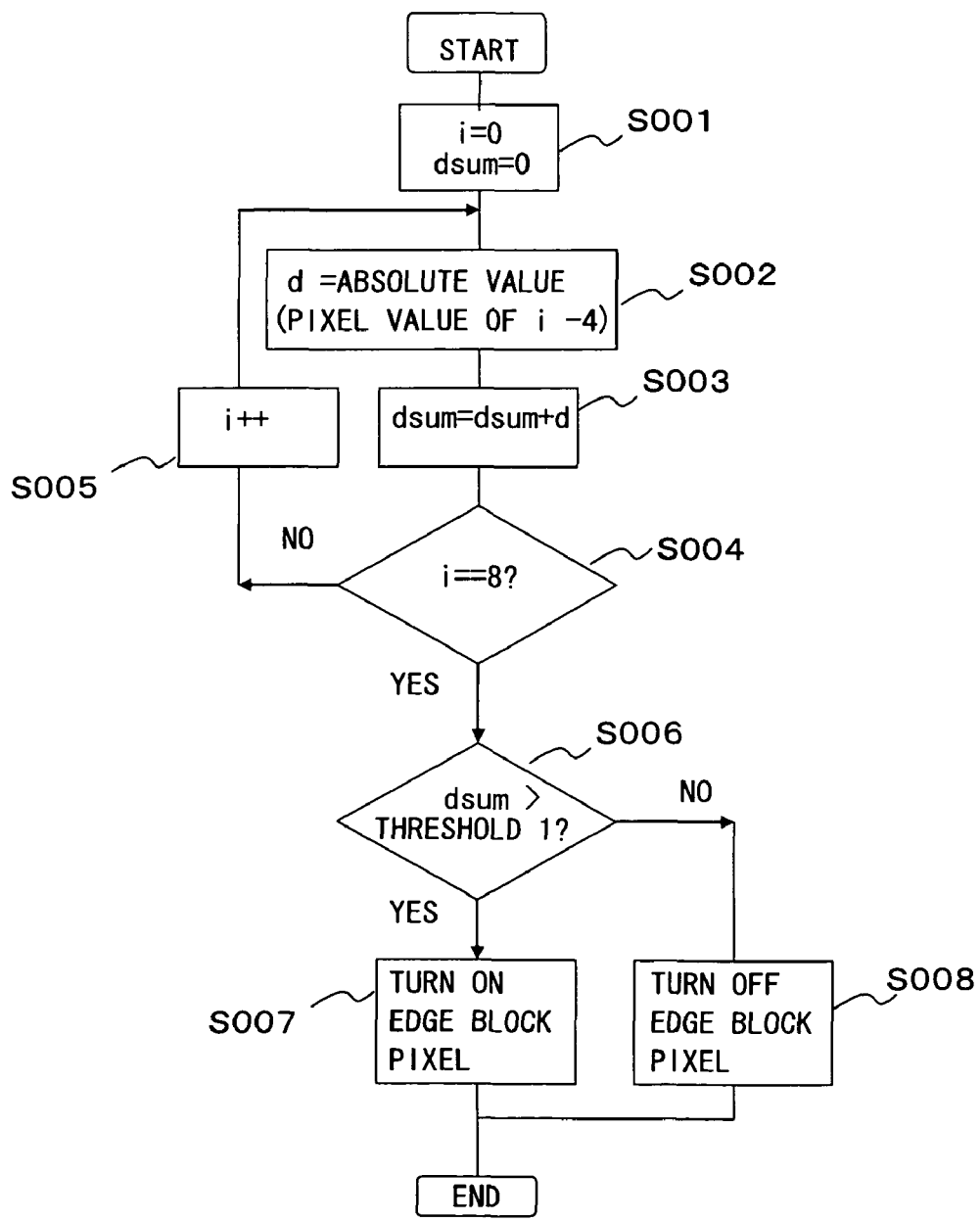
FIG. 5A is a diagram for explaining a target pixel that is defined in a first edge detecting process, and close pixels of the target pixel.
FIG. 5B is a flowchart showing an example of the first edge detecting process.

Subsequently, a description will be given of a first edge detecting processing (edge pixel detecting processing) which is executed by the information processing apparatus 10. FIG. 5A is an explanatory diagram for explaining a target pixel that is defined in the first edge detecting processing, and peripheral pixels (close pixels) of the target pixel. FIG. 5B is a flow chart showing an example of the first edge detecting processing that is executed by the CPU 1. In this example, an edge detecting processing using a pixel difference is applied as the first edge detecting processing.

FIG. 5A shows 9 pixels that constitute a picture to be encoded (original picture). In the first edge detecting processing, it is determined on a pixel basis (unit) whether or not the pixel is an edge pixel that constitutes the edge. In an example shown in FIG. 5A, in the case where the pixel 4 is a pixel to be determined (target pixel), pixels 0 to 3 and pixels 5 to 8 corresponding to adjoining pixels of the pixel 4 are defined as the peripheral pixels of the target pixel. FIG. 5B shows the processing in the case where the pixel 4 is the target pixel.

In FIG. 5B, when the processing starts, the CPU 1 sets a value "i" indicative of the peripheral pixels to zero, and also sets a sum value "dsum", which is a sum of absolute values "d" of the differences between the pixel values (pixel value of "i"-pixel value of the target pixel (pixel 4) to zero (S001).

Subsequently, the CPU 1 obtains the absolute value "d" of the difference between the pixel 0 and the pixel 4 (S002), and adds the absolute value "d" thus obtained to the current value of "dsum" (S003). Then, the CPU 1 determines whether or not the current value of "i" is 8 (S004). When the current value of "i" is not 8 (S004; NO), the CPU 1 adds 1 to the current value of "i" (S005) and the processing is returned to Step S002.

The sum value of "dsum" of the differences between the pixel 4 and each of the peripheral pixels is obtained through the loop processing of Steps S002 to S005. Thereafter, when it is determined that "i" is 8 in Step S004 (S004; YES), the CPU 1 determines whether or not the value of "dsum" exceeds a predetermined threshold value (threshold 1) (S006).

In this situation, when the value of "dsum" exceeds the threshold 1 (YES in S006), the CPU 1 turns on an edge pixel flag of the target pixel (pixel 4) (S007), whereas the value of "dsum" does not exceed the threshold 1 (NO in S006), the CPU 1 turns off the edge pixel flag (S008). Thereafter, the CPU 1 finishes the first edge detecting process with respect to the target pixel.

In this example, a map (edge pixel map) for indicating whether or not each of the pixels of the original image is the edge pixel is prepared on a storage area (for example, external memory device 3) that can be accessed by the CPU 1. The edge pixel flags (for example, on (an edge pixel) or off (not an edge pixel)) indicative of whether or not each of the pixels is the edge pixel are prepared in each field corresponding to each of the pixels in the map. The CPU 1 turns on/off the edge pixel flags on the basis of the determination result of Step S006 in Steps S007 and S008.

The CPU 1 executes the above-described first edge detecting processing (S001 to S008) with all of the pixels that constitute the original image as the target pixels. As a result, the edge pixel map indicative of the distribution of the edge pixels in the original image is generated.

[Edge Block Candidate Determining Processing]

Figure 6:
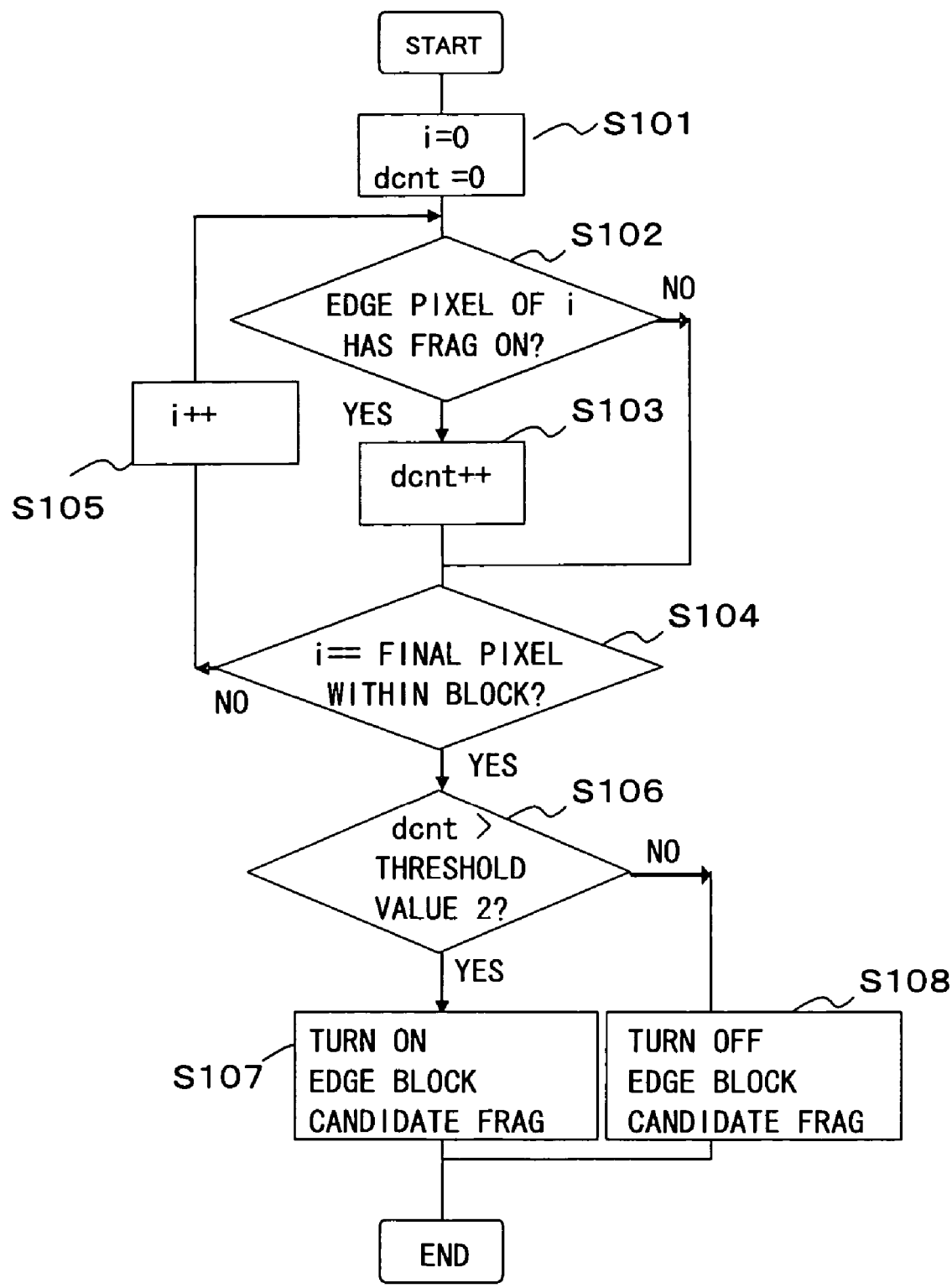
FIG. 6 is a flowchart showing an example of an edge block candidate determining process.

Subsequently, a description will be given of the edge block candidate determining processing that is executed by the information processing apparatus 10. FIG. 6 is a flowchart showing an example the edge block candidate determining processing which is executed by the CPU 1 of the information processing apparatus 10.

The edge block candidate determining processing shown in FIG. 6 is executed in each of the blocks into which the original image has been divided. In the present invention, the block can be defined as an aggregate of one or more pixels. The number of pixels that constitute the block can be selected from an arbitrary number of 1 or more.

In FIG. 6, when the processing starts, the CPU 1 sets a value "i" that specifies one of the pixels included in the target block, and a value "dcnt" indicative of the number of edge pixels to zero, respectively (S101).

Subsequently, the CPU 1 determines whether or not the edge pixel flag of the pixel corresponding to the current value "i" is "on", with reference to the edge pixel map (S102). In this situation, when the edge pixel is "off" (NO in Step 102), the CPU 1 advances the processing to Step S104. On the other hand, when the edge pixel flag is "on" (S102; YES), the CPU 1 adds 1 to the current value of "dcnt" (S103), and advances the processing to Step S104.

In Step S104, the CPU 1 determines whether or not the current value of "i" is indicative of a final pixel within the target block. In this situation, in the case where the value of "i" is not indicative of the final pixel (S104; NO), the CPU 1 adds 1 to the value of "i" (S105), and the processing is returned to Step S102. The number of edge pixels included within the target block is counted through the loop processing of Steps S102 to S105.

Thereafter, in the case where the value of "i" indicative of the final pixel is detected in Step S104 (S104; YES), the CPU 1 determines whether or not the value of "dcnt" exceeds a predetermined threshold value (threshold 2) (S106). In this situation, in the case where the value of "dcnt" exceeds the threshold 2 (S106; YES), the CPU 1 turns on the edge block candidate flag with respect to the target block (S107). On the other hand, in the case where the value of "dcnt" does not exceed the threshold 2 (S106; NO), the CPU 1 turns off the edge block candidate flag (S108). Thereafter, the CPU 1 finishes the edge block candidate determining processing with respect to the target block.

In this example, the edge block candidate map is stored in the storage area 31 of the external storage device 3. The edge block candidate map has edge block candidate flags corresponding to each of the blocks. The CPU 1 reads the edge block candidate map, and turns on/off the edge block candidate flag of the target block according to the determination result of Step S106.

The CPU 1 executes the above-mentioned edge block candidate determining processing (S101 to S108) with all of the blocks corresponding to the original image as the target blocks. As a result, the edge block candidate map becomes in a state where only the edge block candidate flags corresponding to the blocks that are determined as the edge block candidates are turned on. This edge block candidate map is stored in the storage area 31.

<<Second Edge Block Detecting Processing>>
[Second Edge Detecting Processing]

Subsequently, a description will be described of the second edge detecting processing that is executed by the information processing apparatus 10. In the second edge detecting processing, the edge blocks significant to encoding (image quality improvement) are extracted from the edge block candidates by using the edge block candidate map that have been prepared on the basis of the first edge detecting processing.

Figure 7:
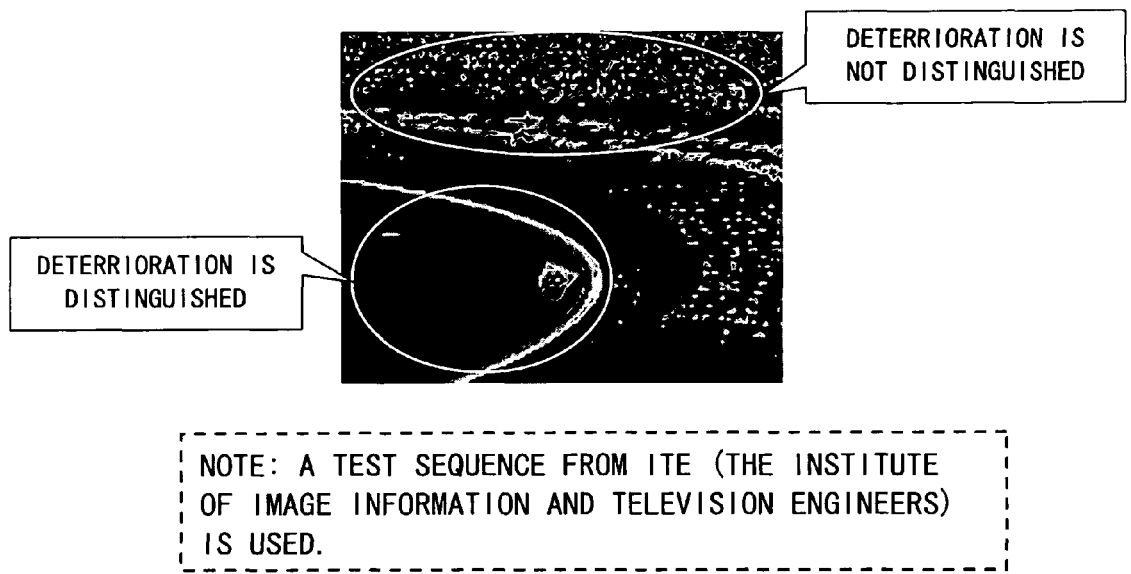
FIG. 7 is a diagram showing an example of a flat portion and a complicated portion in an image.

The edge to be improved in the image quality is an edge that is in contact with a flat portion in the image. For example, FIG. 7 is an example showing a flat portion and a complicated portion in the image, and shows a scene where a person marches on a track of an athletic field. An image shown in FIG. 7 is a test chart of the institute of image information and television engineers.

In this image, the part of spectators' seats is complicated, so even if the edge of the part is a little deteriorated, the deterioration is not distinguished by human's eyes. On the other hand, the deterioration of the edge of the line portion that separates the field from the track in the athletic field induces the recognition that the image quality is deteriorated with the human's eyes, because of the field is flat.

This means that most of the peripheral blocks (close block: for example, blocks of the field portion in FIG. 7) of a block that is required to be detected as the edge block to be improved in the image quality are not determined to be the edge block candidate in the edge block candidate determining processing (ST2: FIG. 6). Accordingly, it can be determined whether or not the target block is a block including the edge that is in contact with the flat portion, by checking the distribution state of the edge block candidates with respect to the peripheral blocks of the target block.

Figure 8A:
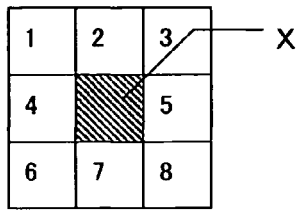
FIG. 8A is a diagram showing a definitional example of the target block and the close blocks in the second edge detecting process.

For that reason, in the second edge detecting processing, the edge determination results (edge block candidate determining process results) of the peripheral blocks of the target block are used for determining whether or not the peripheral blocks are the edge blocks. FIG. 8A is a diagram showing a definitional example of the target block and the peripheral blocks in the second edge detecting processing, and FIG. 8B is a flowchart showing an example of the second edge detecting processing which is executed according to the definition shown in FIG. 8A.

In the example shown in FIG. 8A, when a block having hatching is determined as the target block X, adjacent blocks 1 to 8 that are adjacent to the target block X are defined as the peripheral blocks. The peripheral blocks can include blocks adjacent to the adjacent blocks. Also, one or more blocks that are arbitrarily selected from the adjacent blocks can be defined as the peripheral blocks.

Note that, FIG. 8A shows an example in which the blocks having the adjacent blocks in eight directions are the target blocks. In the case where the block 1 is a block that constitutes a corner of the image, the adjacent blocks are three blocks of 2, X, and 4. Also, in the case where the image is divided into nine blocks as shown in FIG. 8A, the adjacent blocks of a block that forms an end portion of the image such as the block 4 are five blocks of 1, 2, X, 7, and 6.

Figure 8B:
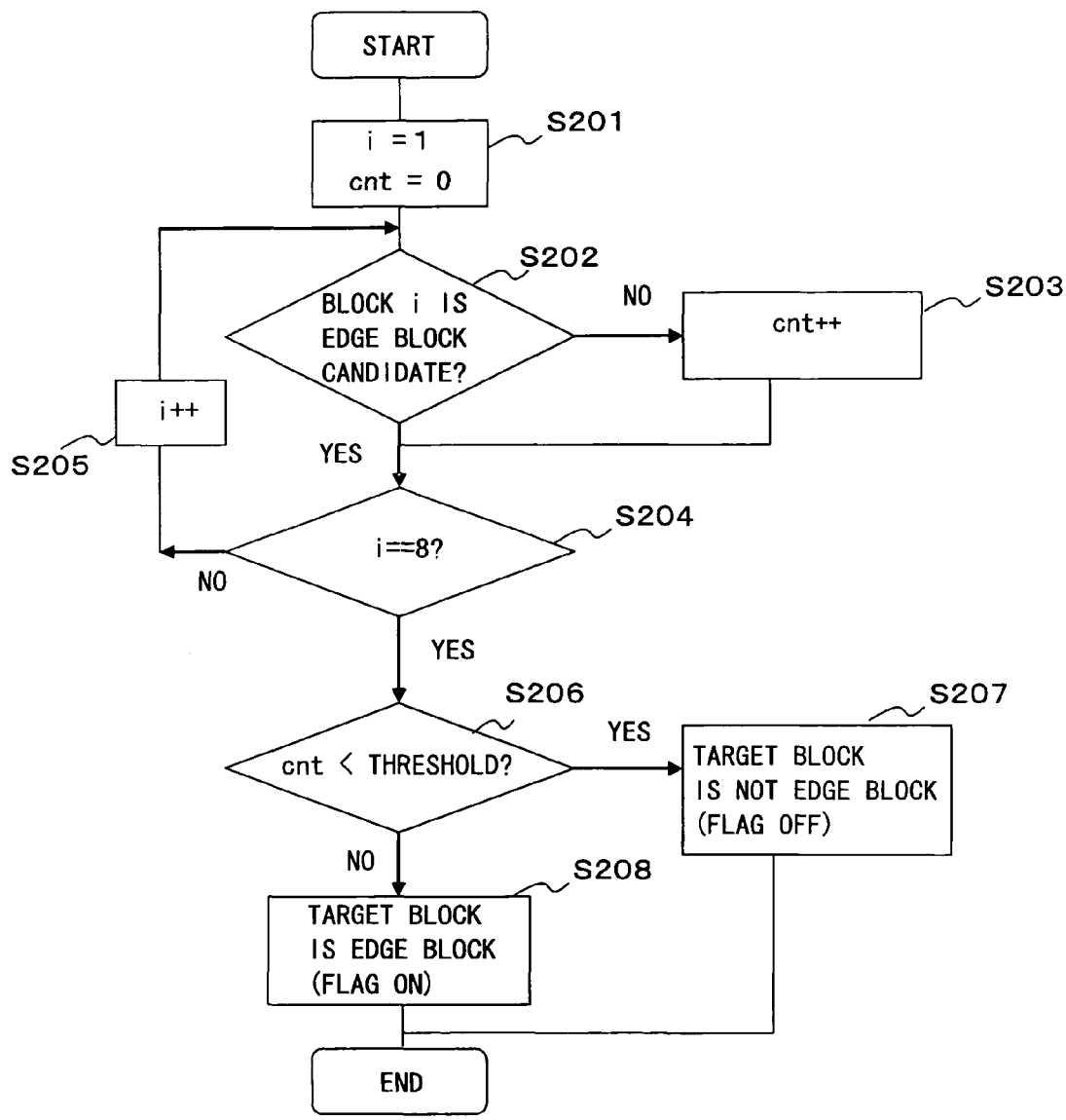
FIG. 8B is a flowchart showing an example of the second edge detecting process which is executed according to the definition shown in FIG. 8A.

FIG. 8B shows the second edge detecting processing in the case where the block X is the target block. The second edge detecting processing is executed by the CPU 1 (FIG. 4). When the processing starts, the CPU 1 reads the edge block candidate map from the storage area 31, and reads a second edge detection result map (initial state) from the storage area 32.

The CPU 1 first sets a value "i" indicative of the peripheral block to "1" (indicative of the block 1), and sets a value "cnt" indicative of the number of peripheral blocks which are the edge block candidates to zero (S201).

Subsequently, the CPU 1 determines whether or not the block "i" is an edge block candidate with reference to the edge block candidate map (S202). In this situation, when the block "i" is the edge block candidate (S202; YES), the CPU 1 advances the processing to Step S204. On the other hand, when the block "i" is not the edge block candidate (S202; NO), the CPU 1 adds 1 to the value of "cnt" (S203), and the processing is advanced to Step S204.

In Step S204, the CPU 1 determines whether or not the current value of "i" indicates a final block (block 8 in this example). In this situation, when the current value of "i" is not 8 (S204; NO), the CPU 1 adds 1 to the current value of "i" (S205), and the processing is returned to Step S202. The CPU 1 determines whether or not each of the peripheral blocks is the edge block candidate through the loop processing of Steps S202 to S205, and counts the number of peripheral blocks which are not the edge block candidates.

Thereafter, when it is determined that the value of "i" is a value indicative of the final block (i=8) in Step S204 (S204; YES), the CPU 1 determines whether or not the value of "cnt" (the number of peripheral blocks that are not edge block candidates) are lower than the threshold value (S206).

In the case where the value of "cnt" is lower than the threshold (S206; YES), the CPU 1 determines that the target block is not the edge block, and turns off the edge block flag of the corresponding block of the second edge detection result map (S207). Thereafter, the CPU 1 finishes the second edge detecting processing with respect to the target block.

On the contrary, when the value of "cnt" is equal to or higher than the threshold (S206; NO), the CPU 1 determines that the target block is the edge block, and turns on the corresponding edge block flag (S208). Thereafter, the CPU 1 finishes the second edge detecting processing with respect to the target block.

The CPU 1 executes the second edge detecting processing (S201 to S208) shown in FIG. 8B with respect to all of the blocks in the edge block candidate map. As a result, the target blocks that the number of peripheral blocks thereof that are the edge block candidates is lower than the threshold, are extracted from the edge block candidates as the edge blocks. Then, the second edge detection result map indicative of the distribution of the edge blocks in the image are stored in the storage area 32. Thereafter, the CPU 1 conducts the encoding processing according to the edge information based on the map, and generates the moving image file including the image encoding result (encoding image).

[Image Encoding Processing]

The CPU 1 conducts the compression encoding on the original image on the basis of the map information that is obtained from the second edge detection result map in the image encoding processing. Herein, the data size of the encoded image which is obtained by compression encoding of the image is predetermined. On the other hand, the data amount (distribution amount of the data size) of the respective blocks that constitute the encoded image can be arbitrarily determined.

The information amount of the respective blocks in the encoded image is determined by the compression ratio of the original image data corresponding to the respective blocks. The information amount that is reduced from the original image is more reduced as the compression ratio becomes lower. For example, in the case where the compression ratio of a certain block is lower than that of another block, the reduced information amount due to the compression of the certain block is reduced than that of another block. Accordingly, the certain block has the information amount larger than that of another block in a result of compression encoding. The image in the block has an image quality closer to that of the original image as the information amount of the block becomes larger.

Accordingly, the CPU 1 determines the information amounts of the respective blocks after being compressed and encoded (the distribution amount of the maximum information amount that the encoded image can have), and executes the compression encoding processing with respect to the respective blocks at the compression ratio at which the information amount obtained as the compression result becomes the distribution amount in the compression encoding processing of the original image. The processing associated with the determination of the information amount (compression ratio) corresponds to the image quality improving processing to be conducted on the edge blocks.

In this situation, the CPU 1 determines the distribution of the information amount in such a manner that the information amounts of the edge blocks are larger than those of the blocks (non-edge blocks) which are not the edge blocks. That is, the CPU 1 conducts the compression encoding control so that the compression encoding is conducted on the edge blocks at the compression ratio lower than that of the non-edge blocks.

Herein, the edge block candidates that are low in the effect of the image quality improvement are excluded from the results of the second edge detecting processing. This means that the information amount that is allocated to the excluded edge block candidates may be reduced. The reduced amount can be allocated to the edge blocks that need to be improved in the image quality. Accordingly, the image quality improvement of the edge blocks is made efficient.

SPECIFIC EXAMPLE

Subsequently, a description will be given of a specific example using an image encoding method (an edge block detecting method) by means of the above-mentioned information processing apparatus 10.

First Specific Example

In execution of the image quality improvement in the image encoding processing, there are limited conditions (for example, the maximum data size of the encoded image). For that reason, it may be desirable that only the edge blocks that are recognized to exhibit the high image quality improvement effect are to be improved in the image quality.

Under the above circumstances, in the second edge detecting processing (FIG. 8), it is determined that the target blocks are not the edge blocks when the number of blocks which are the peripheral blocks of a target block of determination but not the edge block candidates is lower than the threshold, as described above. As a result, it is possible to optimize the detected edge blocks for image encoding.

For example, the threshold that is used in the processing as shown in FIG. 8B is adjusted (threshold is set to 2) so as to judge that the target block is not the edge block when the peripheral blocks that are not the edge block candidates are equal to or lower than 1.

Figure 9A:
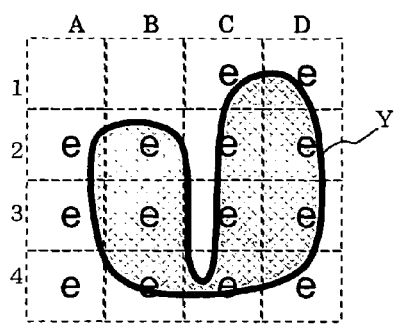
FIG. 9A is a diagram showing an example of an image to targeted to the second edge detecting process according to a first specific example.
Figure 9B:
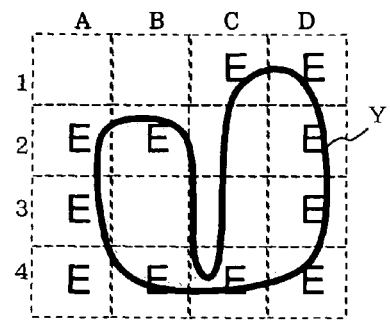
FIG. 9B is a diagram showing the result of executing the second edge detecting process (threshold=2) shown in FIG. 8 with respect to the image shown in FIG. 9A.

FIG. 9A is a diagram showing an example of an image to be targeted to the second edge detecting processing (edge block candidate map) according to the first specific example, and FIG. 9B is a diagram showing the results of executing the second edge detecting processing (threshold=2) shown in FIG. 8 with respect to the image shown in FIG. 9A.

FIG. 9A shows a part of an image (map) composed of 4×4 blocks, which includes an object Y. FIG. 9A shows that the blocks marked with a character "e" are edge block candidates. The adjacent blocks (not shown) of the respective blocks that are positioned at end portions in FIG. 9A (blocks that belong to first or fourth row, and blocks that belong to A or D column) are flat portions (blocks that are not the edge block candidates). In FIG. 9B, the blocks marked with the character of "E" are indicative of blocks that have been extracted as the edge blocks.

After the second edge detecting processing is executed with respect to the image (edge block candidate map) shown in FIG. 9A, the blocks having the peripheral blocks which are not the edge block candidates, the number of which is equal to or lower than 1 (referred to as "exclusion target blocks") are excluded from the edge blocks. That is, the edge block candidates other than the exclusion target blocks are extracted as the edge blocks.

In the example of FIG. 9B, blocks 2-C, 3-B, and 3-C corresponding to the exclusion target blocks are excluded, and the remaining edge block candidates are detected as the edge blocks. In this way, the edge block candidates that are recognized to exhibit the low effect of the image quality improvement are excluded.

As a result, the CPU 1 can allocate the information amount for the image quality improvement which should be allocated to the exclusion target blocks to the edge blocks different from the exclusion target blocks. Accordingly, the CPU 1 can allocate large information amount to the edge blocks including the edges that are in contact with the flat portion large in the area, and conduct the preferred image quality improving processing.

Second Specific Example

A spray of water or gathering of small objects is dealt with as the edge portions in the image encoding. However, the deterioration of the image quality of the water spray or the gathered small objects is not distinguished in evaluation of the image quality. From this viewpoint, it is desirable that the blocks including a part where the small edges are gathered are not detected as the edge blocks.

Under the above circumstances, in the second edge detecting processing shown in FIG. 8B, the threshold is adjusted (the threshold is set to 1) so that it is determined that the target block is not the edge block in the case where all of the peripheral blocks of the target block are the edge block candidates.

Figure 10A:
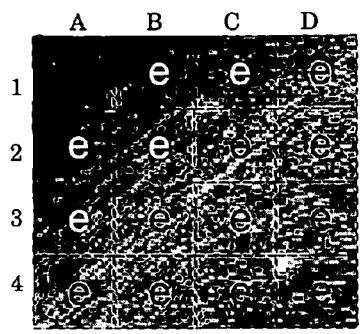
FIG. 10A is a diagram showing an example of an image to be targeted to the second edge detecting process according to a second specific example.
Figure 10B:
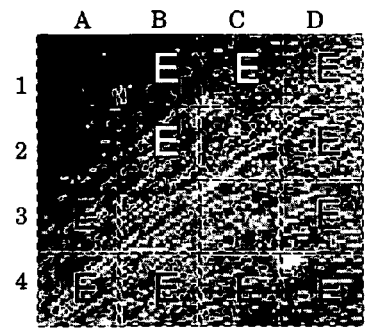
FIG. 10B is a diagram showing the result of executing the second edge detecting process (threshold=1) shown in FIG. 8B with respect to the image shown in FIG. 10A.

FIG. 10A is a diagram showing an example of an image (edge block candidate map) to be targeted to the second edge detecting processing according to the second specific example. FIG. 10B is a diagram showing the result of executing the second edge detecting processing (threshold=1) shown in FIG. 8B with respect to the image shown in FIG. 10A. The images of FIGS. 10A and 10B are parts of the test chart of the institute of image information and television engineers.

FIG. 10A shows an image composed of 4×4 blocks, which represents a spray of water. In FIG. 10A, the blocks marked with the character of "e" are representative of the edge block candidates. In FIG. 10B, the blocks marked with the character of "E" are representative of the edge blocks.

When the second edge detecting processing (FIG. 8B) is executed with respect to the image (edge block candidate map) shown in FIG. 10A, the edge block candidates having the peripheral blocks which are not the edge block candidates, the number of which is lower than 1 (exclusion target blocks) are excluded, and the edge block candidates other than the exclusion target blocks are extracted as the edge blocks as shown in FIG. 10B.

In the example of FIG. 10B, the blocks 2-C, 3-B, and 3-C corresponding to the exclusion target blocks are excluded. Through the above processing, the blocks including the gathering of the minute edges are suppressed from being determined to be the edge blocks. As a result, the information amount for improving the image quality which is allocated to the edge blocks to be improved in the image quality can be increased, and the appropriate image quality improvement and encoding can be conducted.

<Priority Giving Processing>

Subsequently, a description will be given of a priority giving processing corresponding to a modified example of the above-mentioned second edge detecting processing. After the generation of the edge block candidate map has been completed, the priority giving processing is executed instead of the second edge detecting processing.

Figure 11A:
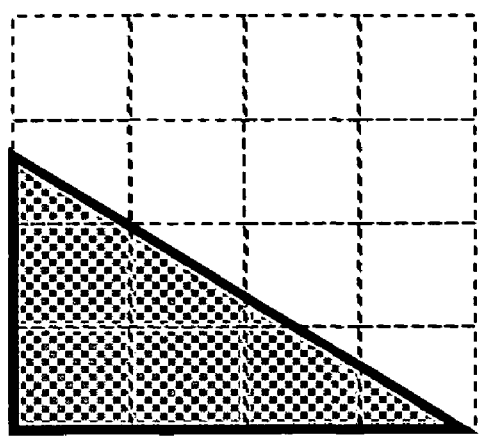
FIGS. 11A and 11B are explanatory diagrams showing a flat portion that is in contact with the edge in the image.
Figure 11B:
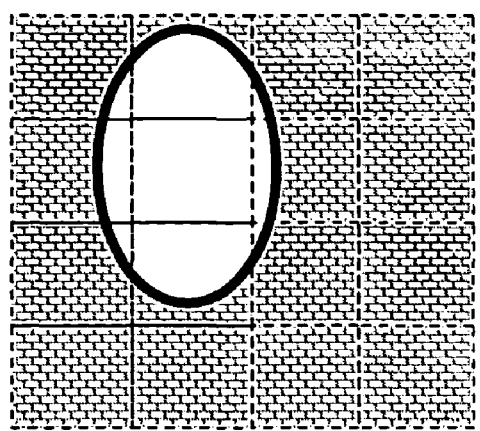

There is a tendency that the deterioration of the image quality of the edges is more visible as an area of the flat portion that is in contact with the edge is larger. For example, it is assumed that a certain original image has portions shown in FIGS. 11A and 11B, respectively. In FIGS. 11A and 11B, a blank portion indicates the flat portion, and a portion having a pattern indicates an object having the edge. In this case, the area of the flat portion that is in contact with the edge shown in FIG. 11A is larger than the area of the flat portion shown in FIG. 11B. Accordingly, in the case where the image quality improving processing is executed with respect to only one of FIGS. 11A and 11B, it is preferable to select FIG. 11A from the viewpoint of obtaining the high image quality improving effect.

The CPU 1 of the information processing apparatus 10 sets the image quality improvement priority with respect to the respective edge block candidates that are indicated in the edge block candidate map. That is, the higher image quality improvement priority than that of the respective edge blocks in the portion shown in FIG. 11B can be given the respective edge blocks shown in FIG. 11A. The image quality improvement priority can be determined in accordance with the number of peripheral blocks which are not the edge block candidates of the respective edge blocks.

FIG. 12 is a flowchart showing an example of the priority giving processing which is executed by the CPU 1 of the information processing apparatus 10. In FIG. 12, a relation of the threshold value 1 and the threshold value 2 satisfies threshold value 1>threshold value 2, and a relation of the priorities 1, 2, and 3 satisfies priority 1>priority 2>priority 3. Also, the processing shown in FIG. 12 starts at the time of completing the preparation of the edge block candidate map.

When the processing starts, the CPU 1 specifies one of the edge block candidates that is a target edge block candidate from the edge block candidate map.

The CPU 1 conducts the same processing as the processing of S201 to S205 shown in FIG. 8B with respect to the target edge block candidate, and obtains the number of peripheral blocks (value of "cnt") which are not the edge block candidates. Subsequently, the CPU 1 determines whether or not the value of "cnt" is equal to or higher than the predetermined threshold value 1 (S301).

In this situation, in the case where the value of "cnt" is equal to or higher than the threshold value 1 (S301; YES), the CPU 1 sets (gives) the priority 1 to the edge block candidate (S302), and completes the priority giving processing with respect to the target edge block candidate.

On the other hand, in the case where the value of "cnt" is lower than the threshold value 1 (S301; NO), the CPU 1 determines whether or not the cnt value of the target edge block candidate is equal to or higher than the given threshold value 2 (S303). In this situation, in the case where the cnt value is equal to or higher than the threshold value 2 (S303; YES), the CPU 1 sets (gives) the priority 2 to the edge block candidate (S304), and completes the priority giving processing with respect to the target edge block candidate.

In contrast, in the case where the value of "cnt" is lower than the threshold value 2 (S303; NO), the CPU 1 sets (gives) the priority 3 to the edge block candidate (S305), and completes the priority giving processing with respect to the target edge block candidate.

The CPU 1 executes the processing of S301 to S305 with respect to all of the edge block candidates represented in the edge block candidate map. In this way, the image quality improvement priority according to the detection status of the edge block candidates related to the peripheral blocks is given to the respective edge block candidates.

In the above processing, the image quality improvement priority map is prepared instead of the second edge detection result map on the basis of the edge block candidate map. The image quality improvement priority map represents the edge block candidates and the priorities that are given to the edge block candidates. The image quality improvement priority map is stored in the external storage device 3 as required.

The CPU 1 conducts the image encoding processing by using the image quality improvement priority map. The respective edge block candidates are dealt with as the edge blocks in the image encoding processing. In this situation, the CPU 1 can execute the image quality improving processing depending on the image quality improvement priority given each of the edge block candidates.

Specific Example

Figure 13A:
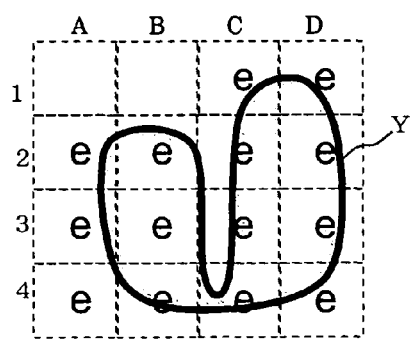
FIG. 13A is a diagram showing an image example to be targeted to the priority giving process.
Figure 13B:
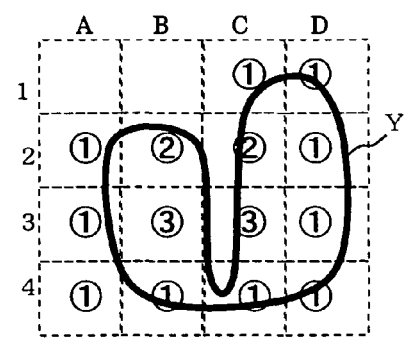
FIG. 13B is an explanatory diagram showing the result of the priority giving process with respect to the image shown in FIG. 13A.

FIG. 13A is a diagram showing an example of an image to be targeted to the priority giving processing (an edge block candidate map), and FIG. 13B is an explanatory diagram showing the result of the priority giving processing with respect to the image shown in FIG. 13A.

FIG. 13A shows a part of an image (map) consisting of 4×4 blocks which includes an object Y as an example of the image to be targeted to the priority giving processing (edge block candidate map). The adjacent blocks not shown of the respective blocks (blocks belonging to a first or fourth row, and blocks belonging to an A or D column) which are positioned at the end portions of FIG. 13A are the flat portions (blocks that are not the edge block candidates).

Referring to FIG. 13A, all of the blocks except for the block 1-A and the block 1-B are detected as the edge block candidates as a result of the first edge block detecting processing with respect to a part of the image (edge block candidates marked with the character of "e").

On the other hand, in FIG. 13B, numbers indicative of the priorities that are given according to the priority giving processing shown in FIG. 12 are expressed on the respective blocks that have been detected as the edge block candidates. The number (1) indicated on the block 2-A represents the priority 1, the number (2) indicated on the block 2-B represents the priority 2, and the number (3) indicated on the block 3-B represents the priority 3. Also, the priority giving result is that "3" is set as the threshold value 1, and "1" is set as the threshold value 2 in the processing shown in FIG. 12.

That is, in FIG. 13B, since the respective blocks positioned at the outermost side (the respective blocks belonging to the first or fourth row, and the respective blocks belonging to the A or D column) have three or more peripheral blocks which are not the edge block candidates, the priority 1 is set to those blocks. On the other hand, since the blocks 2-B and 2-C have one or two peripheral blocks which are not the edge block candidates, the priority 2 is set to those blocks. Also, since the blocks 3-B and 3-C do not have the peripheral blocks which are not the edge block candidates, the priority 3 is set to those blocks.

The CPU 1 conducts the image quality improving processing according to the above priorities. That is, the CPU 1 gives levels to the image quality improvement according to the priorities. That is, differences are given to the information amounts (compression ratios) which are allocated to the respective edge blocks. In the examples shown in FIGS. 12 and 13, the image quality improving processing is executed so that the image quality becomes higher as the priority is higher. For example, the CPU 1 conducts the image quality improvement so that the edges become clear at the maximum degree with respect to the priority 1. Also, the CPU 1 conducts the image quality improvement at a degree lower than the priority 1 with respect to the priorities 2 and 3 (priority 2>priority 3).

Modified Example

The number of image quality improvement priority is not limited to 3 shown in the example of FIG. 12, and can be selected from the arbitrary number of 2 or more.

Also, as a result of the priority giving processing, the edge block candidates having a predetermined priority (for example, the lowest priority (priority 3 in FIG. 12) can be excluded from the edge blocks to be improved in the image quality. For example, a description of the corresponding edge block candidates in the image quality improvement priority map is changed to the same description as the blocks that are not the edge block candidates. As a result, the edge block candidates that have been changed the description are not dealt with as the edge blocks in the image encoding processing. Accordingly, the same effects as those in the second edge detecting processing can be obtained.

Also, after the second edge detection result map has been prepared through the processing shown in FIG. 8B, the processing shown in FIG. 12 may be executed. That is, the priority giving processing may be executed with respect to the edge blocks.

Applied Example

Figure 14:
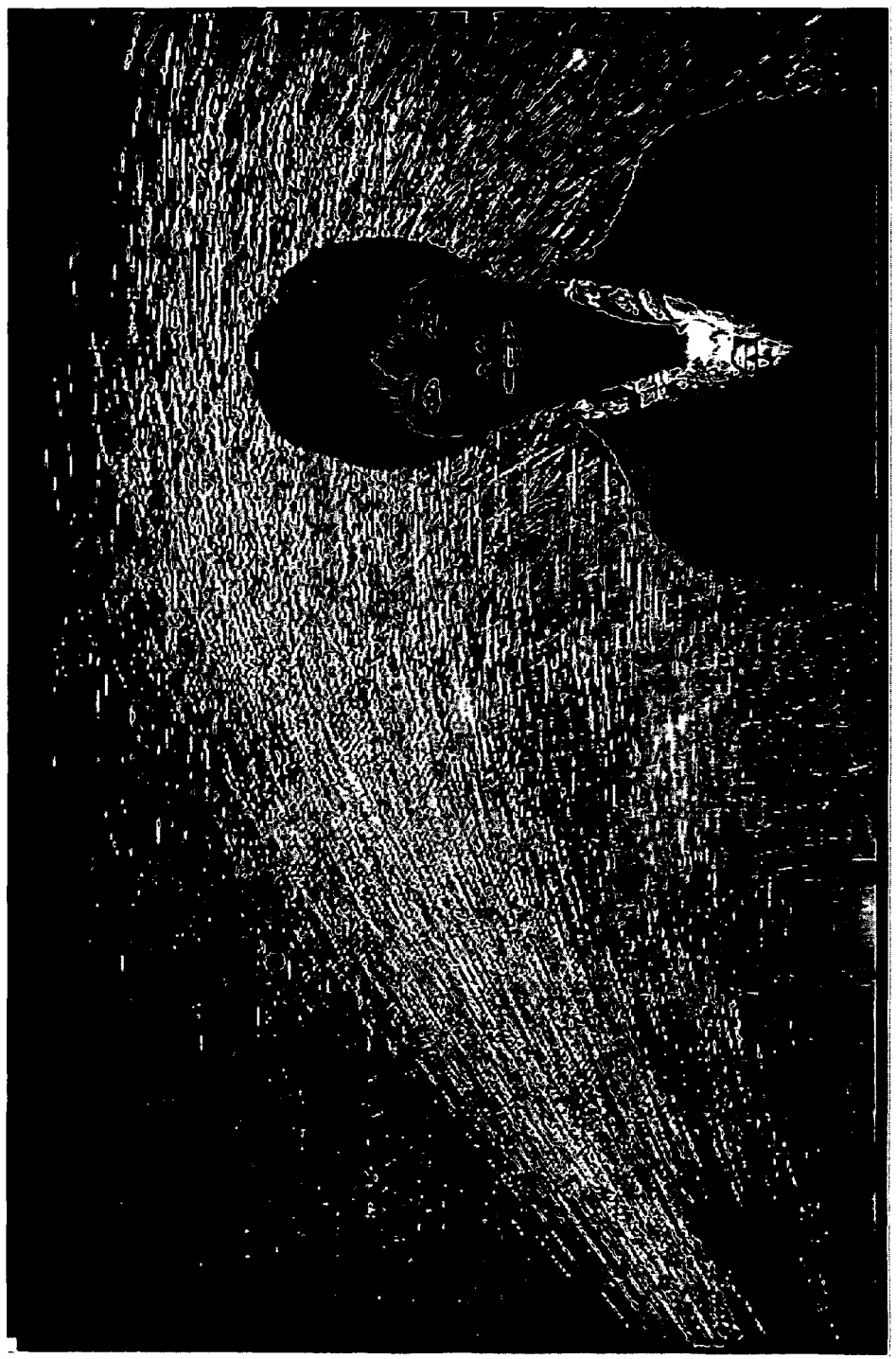
FIG. 14 is a diagram showing an original image to be encoded in the image.
Figure 15:
FIG. 15 is a diagram showing the detection result (edge block candidate map) of the edge blocks by the first edge block detecting process that is executed with respect to the original image shown in FIG. 14.
Figure 16:
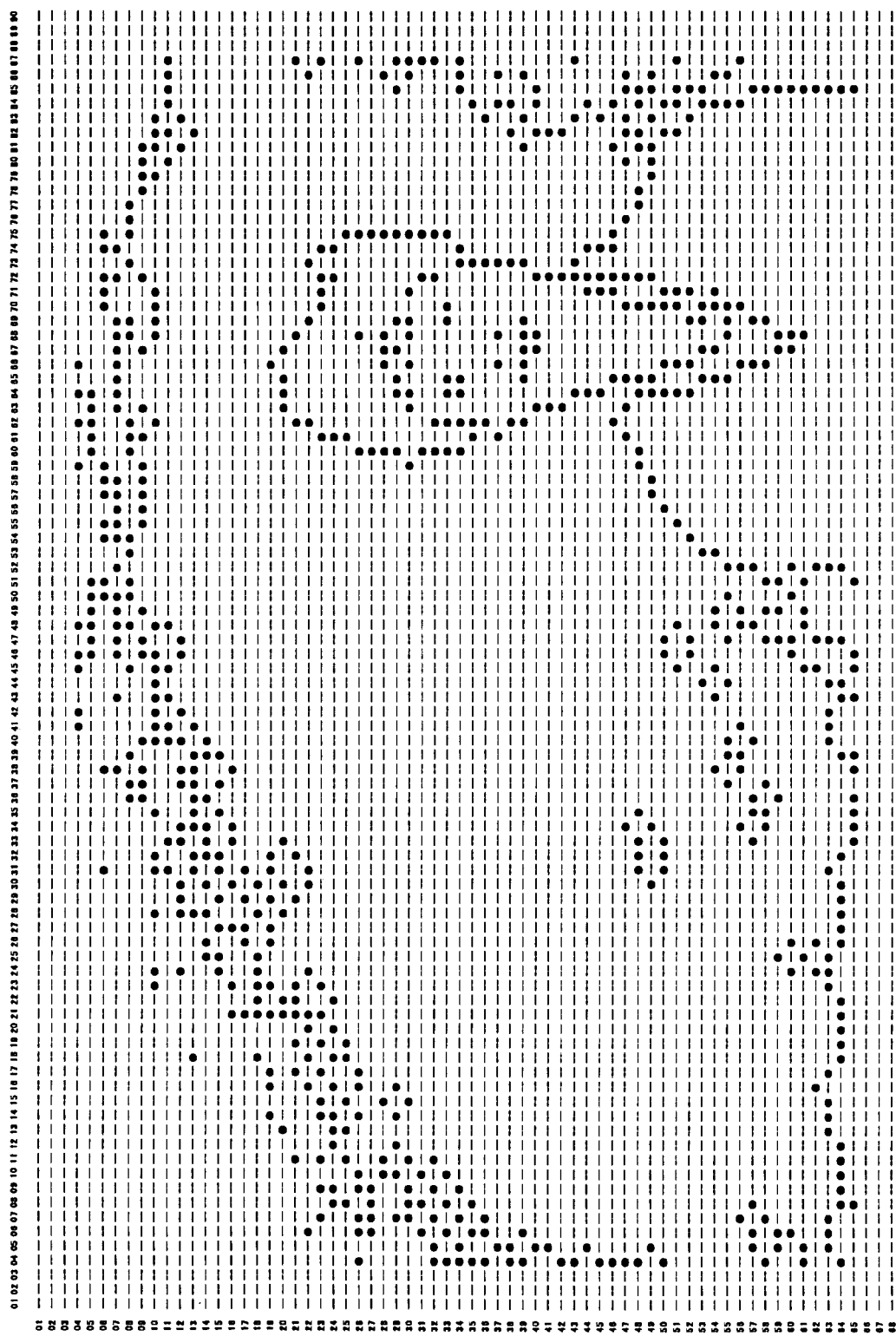
FIG. 16 is a diagram showing the detection result (second edge detection result map) of the edge blocks by the second edge block detecting process that is executed with respect to the original image shown in FIG. 14.

Subsequently, a description will be given of an applied example using the structure of the above-mentioned embodiment. FIG. 14 is a diagram showing an original image to be targeted in the image encoding, and FIG. 15 is a diagram showing the detection result (edge block candidate map) of the edge blocks by the first edge block detecting processing. FIG. 16 is a diagram showing the detection result (second edge detection result map) by the second edge block detecting processing. The original image shown in FIG. 14 is a test chart of the institute of image information and television engineers.

Dots shown in FIGS. 15 and 16 indicate edge blocks. The detection result shown in FIG. 15 is obtained through the processing shown in FIGS. 5 and 6 as the first edge block detecting processing.

As understood from the comparison of FIG. 15 with FIG. 16, the edge blocks that are recognized as no necessity of the image quality improvement are remarkably reduced (excluded) by the second edge block detecting processing. The number of detection of the edge blocks by the first edge block detecting processing is 3613 whereas the number of detection of the edge blocks by the second edge block detecting processing is 686.

As described above, according to the present invention, the number of detection of the edge blocks is reduced to make it possible to execute the image encoding processing including the appropriate image quality improving processing of the edges.

Operation and Effects of Embodiments

According to this embodiment, in the second edge block detecting processing subsequent to the first edge block detecting processing, the edge blocks significant in encoding (to be improved in the image quality) are extracted from the edge block candidates that have been detected in the first edge block detecting processing. That is, the blocks that are recognized as the low image quality improvement effect are excluded from the detection result of the edge blocks. As a result, the number of edge blocks to be encoded (image quality improvement) can be reduced, and the encoding (image quality improvement) processing can be effectively executed.

In this situation, the information amounts that should be allocated to the blocks of the edge block candidates which have not been detected as the edge blocks can be allocated to the edge blocks. As a result, the appropriate image quality improving processing of the edge blocks can be conducted.

Also, according to this embodiment, the image quality improvement priority is given to each of the edge blocks through the priority giving processing, and the image quality improving processing is executed according to the priorities. As a result, a load (CPU time, information amount) of the image quality improving processing on the respective edge blocks can be appropriately distributed, and the effective image quality improving processing can be executed.

As described above, according to this embodiment, there is realized a technique by which the edge portions of an object in which the deterioration of the image quality is distinguished by the image encoding are properly detected through a simple processing that is also mountable on the image encoding apparatus (for communication) of the real-time operation from the viewpoint of the encoding efficiency. That is, the second edge block detecting processing and the priority giving processing which are described in this embodiment are simple processing using the first edge block detecting processing result, and a processing time required for those processing is short. Accordingly, there is little influence from introducing those processing.

[Others]

The disclosures of Japanese patent application No. JP2005-289051 filed on Sep. 30, 2005 including the specification, drawings and abstract are incorporated herein by reference.

What is claimed is:

1. An image encoding apparatus, comprising:
  a processor including:
    a detection unit detecting edge blocks as blocks each including an edge in an image composed of plural blocks; and
    a giving unit giving a priority of image quality improving processing which is executed with respect to the edge blocks in encoding processing of the image to each of the edge blocks detected, the priority corresponding to the number of blocks which have not been detected as the edge blocks by the detection unit and which are on a periphery of the each of the edge blocks detected.

2. The image encoding apparatus according to claim 1, wherein the image quality improving processing is executed for obtaining an image quality according to the priority.

3. The image encoding apparatus according to 1, wherein the edge block to which a predetermined priority is given is excluded from the edge blocks to be targeted in the image quality improving processing.

4. An image encoding method, comprising:
  detecting edge blocks as blocks each including an edge in an image composed of plural blocks; and
  giving a priority of image quality improving processing which is executed with respect to the edge blocks in encoding processing of the image to each of the edge blocks detected, the priority corresponding to the number of blocks which have not been detected as the edge blocks and which are on a periphery of the each of the detected edge blocks.

5. The image encoding method according to claim 4, wherein the image quality improving processing is executed for obtaining an image quality according to the priority.

6. The image encoding method according to claim 4, wherein the edge block to which a predetermined priority is given is excluded from the edge blocks to be targeted in the image quality improving processing.

7. A non-transitory recording medium on which a program executed by an information processor is recorded, the program comprising:
  detecting edge blocks as blocks each including an edge in an image composed of plural blocks; and
  giving a priority of image quality improving processing which is executed with respect to the edge blocks in encoding processing of the image to each of the edge blocks detected, the priority corresponding to the number of the blocks which have not been detected as the edge blocks and which are on a periphery of the each of the edge blocks detected.

8. The recording medium according to claim 7, wherein the edge block to which a predetermined priority is given is excluded from the edge blocks to be targeted in the image quality improving processing.

* * * * *